June 3, 1947.                D. H. WARE                2,421,668
                         BEARING CONSTRUCTION
                         Filed Jan. 12, 1945         2 Sheets-Sheet 1
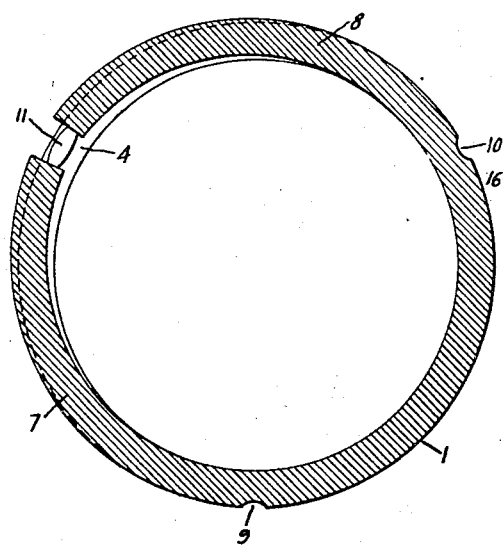
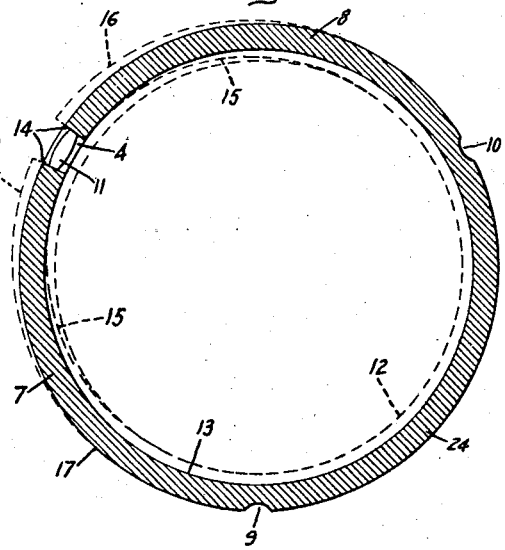
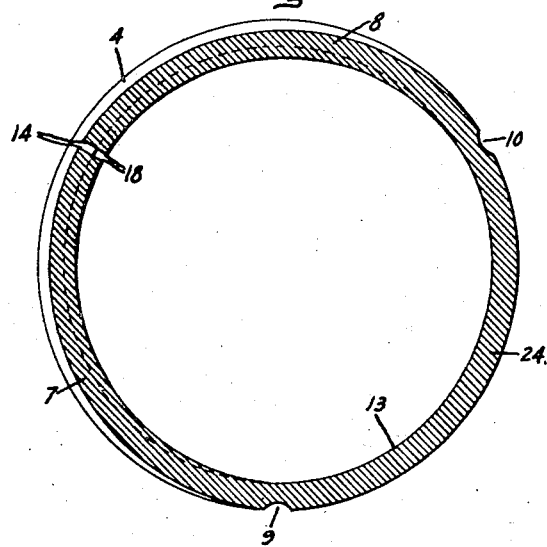
Inventor:
David H. Ware,
by Harry E. Dunham
His Attorney.

June 3, 1947. D. H. WARE 2,421,668
BEARING CONSTRUCTION
Filed Jan. 12, 1945 2 Sheets—Sheet 2
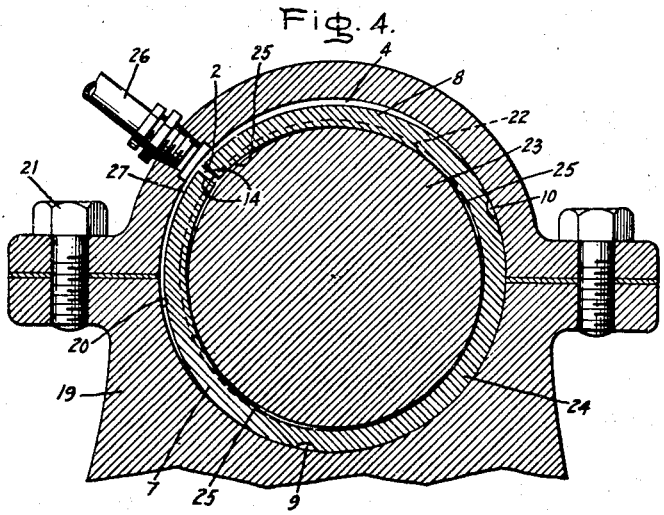
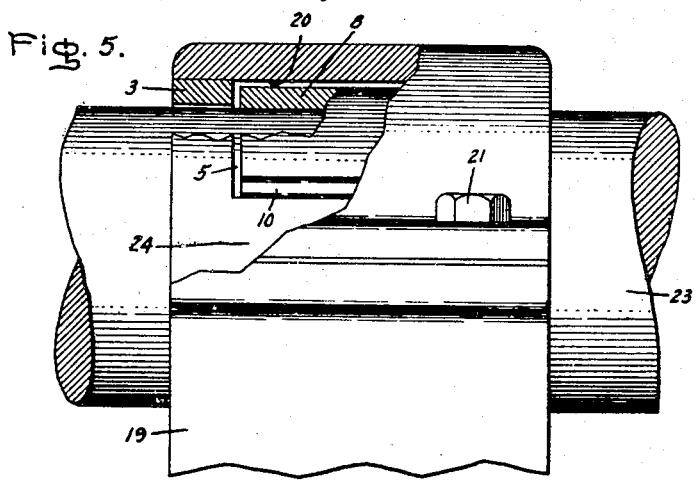
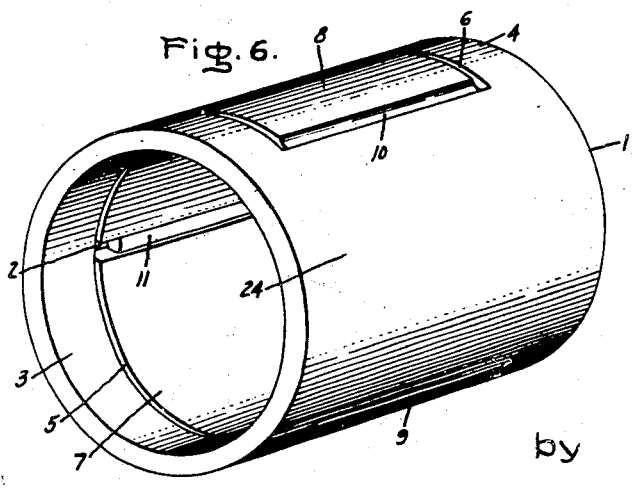
Inventor:
David H. Ware,
by Harry E. Dunham
His Attorney.

Patented June 3, 1947

2,421,668

UNITED STATES PATENT OFFICE 2,421,668

BEARING CONSTRUCTION

David H. Ware, Schenectady, N. Y., assignor to General Electric Company, a corporation of New York Application January 12, 1945, Serial No. 572,535

9 Claims. (Cl. 308—240)

1

My invention relates to bearings and to an improved method of making the same and particularly to bearings which are adaptable to be used with high speed shafts.

An object of my invention is to provide an improved bearing of the pivoted pad type.

Another object of my invention is to provide an improved high speed shaft bearing having resiliently mounted bearing elements or portions arranged to provide a plurality of bearing supporting sections with intermediate relieved lubricant wedge spaces.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is an end sectional view taken through a bearing of my improved construction prior to machining for changing the inner diameter of the bearing and finishing the outer surface of the pivoted pad portions thereof; Fig. 2 is an end sectional view through the bearing shown in Fig. 1 showing the finished diameter of the various parts of the bearing and in dotted lines showing the original dimensions thereof; Fig. 3 is a sectional view through the bearings shown in Fig. 2 with the machining expander removed from between the ends of the pivoted pad portions of the bearing; Fig. 4 is a sectional view through a mounting including the bearing shown in Fig. 3 arranged in a suitable mounting pedestal and a shaft supported in the bearing; Fig. 5 is a side elevational view, partly broken away, of the construction shown in Fig. 4; and Fig. 6 is a perspective view of the completed bearing shown in Figs. 3, 4, and 5.

Referring to the drawing, I have shown an embodiment of my invention in which a pivoted pad bearing 1 is formed from a substantially cylindrical journal bearing stock by my improved method of manufacture. In making this type bearing, it is desirable that the bearing be provided with a plurality of relatively small bearing supporting surfaces between which lubricant wedge spaces are formed for continually supplying a small amount of lubricant to the bearing surfaces. In order to make this type bearing without the use of external spring biasing members, it is desirable that the bearing pad portions should be resiliently biased towards each other and formed with the bearing supporting sur-

2 faces thereof on a larger diameter than the diameter of the supported cylindrical member or shaft. In order to illustrate more clearly the method of making such a bearing, Figs. 1, 2, and 3 have been exaggerated to bring out the steps in the manufacture of such a bearing. An element of suitable spring material, such as spring steel or spring brass, of substantially cylindrical section is formed with a central longitudinally extending split 2 between unsplit cylindrical mounting end portions 3 and 4, and circumferentially extending slots 5 and 6 are formed at each end of the longitudinally extending split 2 and extend about one-third of the circumference in each direction away from the split 2. This provides a pair of resiliently connected bearing pad portions 7 and 8 extending on both sides of the split and disconnected along three edges thereof by the split and by the circumferentially extending slots. Longitudinally extending grooves 9 and 10 are formed at the closed ends of the bearing pad portions 7 and 8 and extend between the slots 5 and 6 to increase the flexibility of the connecting parts of the bearing.

After thus forming the main elements of the bearing, the two pivoted bearing pads 7 and 8 are spread apart outwardly by a spreader element 11, as shown more clearly in Fig. 1. In order to provide a larger diameter to the bearing surfaces, the thickness of the bearing 1 is reduced in any suitable manner, as by grinding, from its original inner diameter, indicated by the dotted line 12 in Fig. 2, to a larger diameter, indicated by the inner cylindrical surface 13. In order to make this surface cylindrical with the bearing pad portions 7 and 8 in their expanded positions, the amount of material removed must be at least equivalent to the outward expansion of the inner end 14 of the bearing pads 7 and 8. As shown by the dotted line 12, the cylindrical end portions 3 and 4 of the bearing and the portion of the bearing between the grooves 9 and 10 which connects the pads 7 and 8 is reduced, as shown by the dotted line 12, while the pivoted pad portions of the bearings 7 and 8 are reduced at least from the dotted lines 15 to the surface 13.

In most instances, it will be found desirable to have a bearing of substantially uniform thickness, and in order to provide this uniform thickness, the outer surface of the bearing is reduced, as shown in Fig. 2, by turning, grinding, or in any other suitable manner from the dimension, indicated by the dotted lines 16, to the outer cylindrical surface 17. In thus reducing the outer diameter of the bearing member, it is not necessary to reduce the dimensions of the cylindrical end portions 3 and 4 or of the portions of the bearing included between the grooves 9 and 10 between the pads 7 and 8, but only to remove the excess material from the two bearing pad portions 7 and 8, although it may be found desirable to take a small cut or to grind off a very small amount of material from the entire outer surface of the bearing in order to assure a true cylindrical surface. After the outer and inner diameters of the bearing have been turned to true cylindrical surfaces, as indicated by the surfaces 13 and 17 in Fig. 2, the expander element 11 is removed from between the end 14 of the bearing pads 7 and 8 and the pads then will assume the position shown in Fig. 3, in which the inner ends 18 will return to the original position of these points prior to the expansion of the pads 7 and 8 by the expander element 11. Thus, the two pad portions 7 and 8 of the bearing will be normally biased inwardly of the bearing cylindrical mounting portions 3 and 4 and form spring pad elements which are pivotally secured to the bearing portions between the grooves 9 and 10 by the resilient connection formed by the material of reduced section at the grooves 9 and 10. If desired, the internal bearing surfaces may be coated with babbit or similar bearing material.

In my improved mounting structure, the bearing member shown in Fig. 3 is adapted to be mounted in a pedestal or other suitable supporting member having a substantially cylindrical mounting portion 20 which may, if desired, be split and secured together by suitable bolts 21, as shown in Fig. 4, to facilitate the insertion and removal of the bearing. The cylindrical portion of the mounting member is formed on a diameter substantially the same as the outer finished diameter of the bearing mounting portions 3 and 4 which have been formed to an inner diameter larger than the diameter of the supported member or shaft, as indicated by the dotted line 22 in Fig. 4. The supported member or shaft 23 is formed on a diameter slightly larger than the distance from the inner free ends 18 of the bearing pads 7 and 8 to the diametrically opposite points of the intermediate bearing portion 24, as shown in Fig. 3, and when the shaft 23 is inserted in the bearing, as shown in Fig. 4, the pivoted pad portions 7 and 8 are biased outwardly by the shaft, thereby exerting a spring force on the supported shaft. Since the diameter on which the curvatures of the inner surfaces of the bearing pad portions 7 and 8 and of the intermediate portions 24 are formed on a large diameter than the diameter of the shaft 23, each of these bearing portions is arranged to support the supported shaft on only a central relatively small section thereof and to form relieved bearing portions providing lubricant wedge spaces 25 between the supporting portions of the bearing. Lubricant is adapted to be supplied to the spaces 25 by a suitable lubricant fitting 26 which supplies lubricating oil to the space 27 between the pivoted pads 7 and 8 and the inner diameter of the mounting member 19, such that this lubricating oil can pass through the longitudinally extending split 2 between the ends 14 of the bearing pads 7 and 8 into the wedge spaces 25, and thereby provide a continuous thin film of oil on which the shaft 23 is carried. This provides for a resilient support of the supported shaft member 23 and for very accurate centering thereof. The construction assures a minimum of bearing friction by providing only a very small bearing surface on which the shaft is supported and also assures an adequate supply of lubricant at all times to these bearing surfaces, thereby minimizing wear and friction of these supporting surfaces.

My improved method of making this bearing is described and claimed in my divisional application Serial No. 648,762, filed February 19, 1946.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A bearing member for a substantially cylindrical supported member including a substantially cylindical mounting portion for supporting and securing said bearing member in position and having a larger inner diameter than said supported member, said bearing member being arranged around said supported member and having a pair of bearing pad portions resiliently secured to a third bearing portion formed to the same diameters as said bearing mounting portions and each arranged to support said supported member on a central relatively small section thereof, and said bearing portions of said bearing having internal surfaces formed on arcs of the same diameter as said bearing cylindrical mounting portion and normally biased inwardly to a diameter less than the diameter of said bearing cylindrical mounting portions and said supported member and adapted to be biased outwardly by said supported member for providing relieved portions forming lubricant wedge spaces between said bearing and said supported member.

2. A bearing member for a substantially cylindrical supported member including a substantially cylindrical mounting portion formed with a larger inner diameter than the diameter of said supported member at each end thereof for supporting said bearing member in position, said bearing member having a longitudinally split central portion with a pair of resiliently connected bearing portions extending on both sides of said split and disconnected along three edges thereof by said split and by circumferentially extending slots and resiliently secured at the other edge thereof to a third bearing portion, each of said bearing portions being arranged to support said supported member on a central relatively small section thereof, and the inner surfaces of said bearing portions being formed on arcs of substantially the same diameter as said bearing cylindrical mounting portion and normally biased inwardly to a position less than the diameter of said supported member and adapted to be biased outwardly by said supported member providing relieved bearing portions forming lubricant wedge spaces between said bearing and said supported member.

3. A structure including a mounting member having a substantially cylindrical mounting portion, a substantially cylindrical member adapted to be supported, means including a supporting bearing member having a substantially cylindrical mounting portion at each end thereof arranged in said cylindrical mounting portion of said mounting member for supporting and securing said bearing member in position, said bearing member being arranged within said mounting member and around said supported member and having a plurality of resilient bearing portions each arranged to support said supported member on a central relatively small section thereof, said bearing portions of said bearing having internal surfaces formed on arcs of larger diameter than the adjacent cylindrical surface of said supported member thereby providing relieved portions forming lubricant wedge surfaces between said bearing and said supported member, and means for supplying lubricant to said bearing member.

4. A structure including a mounting member having a substantially cylindrical mounting portion, a substantially cylindrical member adapted to be supported, means including a bearing member having a substantially cylindrical mounting portion at each end thereof arranged in said cylindrical mounting portion of said mounting member for supporting and securing said bearing member in position, said bearing member being arranged within said mounting member and around said supported member and having a pair of bearing portions resiliently secured to a third bearing portion formed to the same diameters as said bearing mounting portions and each arranged to support said supported member on a central relatively small section thereof, and said bearing portions of said bearing having internal surfaces formed on arcs of larger diameter than the adjacent cylindrical surface of said supported member and normally biased inwardly to a diameter less than the diameter of said supported member and biased outwardly by said supported member providing relieved portions forming lubricant wedge surfaces between said bearing and said supported member.

5. A structure including a mounting member having a substantially cylindrical mounting portion, a substantially cylindrical member adapted to be supported, means including a bearing member having a substantially cylindrical mounting portion arranged in said cylindrical mounting portion of said mounting member for supporting and securing said bearing member in position and having a larger inner diameter than said supported member, said bearing member being arranged within said mounting member and around said supported member and having a pair of bearing pad portions resiliently secured to a third bearing portion formed to the same diameters as said bearing mounting portions and each arranged to support said supported member on a central relatively small section thereof, said bearing portions of said bearing having internal surfaces formed on arcs of the same diameter as said bearing cylindrical mounting portion and normally biased inwardly to a diameter less than the diameter of said bearing cylindrical mounting portions and said supported member and biased outwardly by said supported member providing relieved portions forming lubricant wedge spaces between said bearing and said supported member, and means for supplying lubricant to said bearing lubricant wedge spaces.

6. A structure including a mounting member having a substantially cylindrical mounting portion, a substantially cylindrical member adapted to be supported, means including a bearing member having a substantially cylindrical mounting portion at each end thereof arranged in said cylindrical mounting portion of said mounting member for supporting and securing said bearing member in position, said bearing member being arranged within said mounting member and around said supported member and having a pair of bearing pad portions resiliently secured to a third bearing portion formed to the same diameters as said bearing mounting portions and each arranged to support said supported member on a central relatively small section thereof, said bearing portions of said bearing having internal surfaces formed on arcs of larger diameter than the adjacent cylindrical surface of said supported member and said bearing pad portions being normally biased inwardly to a diameter less than the diameter of said bearing cylindrical mounting portions and said supported member and biased outwardly by said supported member providing relieved portions forming lubricant wedge spaces between said bearing and said supported member, and means for supplying lubricant to said bearing lubricant wedge spaces.

7. A structure including a mounting member having a substantially cylindrical mounting portion, a substantially cylindrical member adapted to be supported, means including a supporting bearing member having a substantially cylindrical mounting portion formed with a larger inner diameter than the diameter of said supported member arranged in said cylindrical mounting portion of said mounting member for supporting and securing said bearing member in position, said bearing member being arranged within said mounting member and having a longitudinally split central portion with a pair of resilient bearing portions extending on both sides of said split and disconnected along three edges thereof by said split and by circumferentially extending slots and pivotally secured at the outer edge thereof to a third bearing portion, each of said bearing portions being arranged to support said supported member on a central relatively small section thereof, the inner surface of said bearing portions being formed on arcs of larger diameter than the adjacent cylindrical surface of said supported member thereby providing relieved bearing portions forming lubricant wedge spaces between said bearing and said supported member, and means for supplying lubricant to said bearing member wedge spaces.

8. A structure including a mounting member having a substantially cylindrical mounting portion, a substantially cylindrical member adapted to be supported, means including a bearing member having a substantially cylindrical mounting portion formed with a larger inner diameter than the diameter of said supported member at each end thereof arranged in said cylindrical mounting portion of said mounting member for supporting and securing said bearing member in position, said bearing member being arranged within said mounting member and having a longitudinally split central portion with a pair of resiliently connected bearing portions extending on both sides of said split and disconnected along three edges thereof by said split and by circumferentially extending slots and resiliently secured at the other edge thereof to a third bearing portion, each of said bearing portions being arranged to support said supported member on a central relatively small section thereof, the inner surfaces of said bearing portions being formed on arcs of substantially the same diameter as said bearing cylindrical mounting portion and normally biased inwardly to a position less than the diameter of said supported member and biased outwardly by said supported member providing relieved bearing portions forming lubricant wedge spaces between said bearing and said supported member, and means for supplying lubricant to said bearing member wedge spaces.

9. A structure including a mounting member having a substantially cylindrical mounting portion, a substantially cylindrical member adapted to be supported, means including a bearing member having a substantially cylindrical mounting portion formed with a larger inner diameter than the diameter of said supported member at each end thereof arranged in said cylindrical mounting portion of said mounting member for supporting and securing said bearing member in position, said bearing member being arranged within said mounting member and having a longitudinally split central portion with a pair of resiliently connected bearing portions extending on both sides of said split and disconnected along three edges thereof by said split and by circumferentially extending slots and resiliently secured at the other edge thereof to a third bearing portion, each of said bearing portions being arranged to support said supported member on a central relatively small section thereof, the inner surfaces of said bearing portions being formed on arcs of larger diameter than the adjacent cylindrical surface of said supported member thereby providing relieved bearing portions forming lubricant wedge spaces between said bearing and said supported member, said resiliently connected bearing portions being normally biased inwardly of said bearing cylindrical mounting portions and biased outwardly by said supported member for exerting a spring force on said supported member, and means for supplying lubricant to said bearing member wedge spaces.

DAVID H. WARE.

REFERENCES CITED

The following references are of record in the file of this patent:

UNITED STATES PATENTS

| Number | Name | Date |
|---|---|---|
| 2,349,690 | Arms | May 23, 1944 |
| 2,277,167 | Steiner | Mar. 24, 1942 |
| 2,230,637 | Bierdermann | Feb. 4, 1941 |